May 6, 1930. W. A. RANKIN 1,757,334
WAFFLE IRON
Filed Jan. 24, 1929 4 Sheets-Sheet 1

Inventor
W. A. Rankin.
By Robert Cobb
Attorneys

Inventor
W. A. Rankin.
By Robert Robb
Attorneys

May 6, 1930.  W. A. RANKIN  1,757,334
WAFFLE IRON
Filed Jan. 24, 1929   4 Sheets-Sheet 3

Inventor
W. A. Rankin.

Attorneys

May 6, 1930.   W. A. RANKIN   1,757,334
WAFFLE IRON
Filed Jan. 24, 1929   4 Sheets-Sheet 4

Inventor
W. A. Rankin
By Robert Pohl
Attorneys

Patented May 6, 1930

1,757,334

UNITED STATES PATENT OFFICE

WILLIAM A. RANKIN, OF TOLEDO, OHIO, ASSIGNOR TO THE SWARTZBAUGH MANUFACTURING COMPANY, OF TOLEDO, OHIO, A CORPORATION

WAFFLE IRON

Application filed January 24, 1929. Serial No. 334,712.

Pastries that are made from a batter and cooked by coming in contact with a hot cooking surface have characteristics which are peculiar to them. Aside from the fact that such batter products have a taste or flavor which is distinctly their own, they are quickly cooked and are therefore particularly adapted for sale in the commercial field.

I have taken recognition of the foregoing facts and propose to provide a pastry product such as above noted, namely, a waffle, which is designed to act primarily as a jacket for food stuffs, having the hot wiener particularly in mind. This invention therefore has as its principal object, the provision of a cooking iron which will produce batter products of a new shape and which shape imparts to the said products the ability to act as a jacket or container for food stuffs.

In carrying out this idea more in detail, my aim is to provide a waffle iron which will produce semi-concave waffles, two of which may be employed conjunctively to form a jacket for a hot wiener, or else one of which may be used as a container for food such as creamed chicken, etc. Under the last mentioned condition of usage, the waffle would preferably be served with the concave side facing the serving platter, whereby pleasing appearance effect is provided. Also the waffle is adapted for the reception of any dressing as butter, syrup, etc. due to the formation of the usual recesses in the exterior surfaces thereof. Inasmuch as present commercial conditions point to the fact that the greatest possibilities of such a food product as I propose to provide are associated with the hot wiener field, a more particular object of the invention is to provide a waffle iron which will make the semi-concave waffles in pairs, each pair providing the complete jacket for a sausage. At this point it might be well to mention that my invention has at least two distinct embodiments,—a waffle iron for home use which is designed to cook merely a single pair of waffles, and the iron which is intended for commercial or restaurant use which is capable of cooking several pairs of jackets simultaneously. In the latter form, independent heat controls for each set of molds are provided.

Ever since the waffle has been known as such, it has been characterized by the fact that it has a surface having depressions therein, the depressions being caused by projections on the cooking metal which project from the mold. Such an arrangement insures the proper cooking of a waffle because it provides for a condition wherein none of the batter is spaced so far from the cooking metal that it will not be properly cooked in a short time. Such arrangements are good practice and I do not intend to depart from them in providing my novel waffle iron. However, in view of the fact that my iron is designed to produce semi-concave waffles and these waffles are to be formed with depressions as is conventional, a particular object of the invention is to so arrange the projections on the cooking metal of the molds, that the waffles in cooked condition may be readily removed. Such would not be the case were the projections merely indiscriminately arranged on the molds.

Another feature of the invention of no little importance, is the provision of an iron including mold members which will form waffles in pairs, each waffle of which is complemental to the other, and which waffles that are formed by the molds will include means interlocking them together, whereby they are rendered more adaptable for use as a jacket of a hot sausage. With this end in view, each of the waffles is formed with recesses and lugs properly disposed so that they will cooperate with complemental recesses and lugs on the other waffle to prevent relative movement therebetween.

With these and other objects in view as will in part become apparent and in part be hereinafter stated, the invention comprises certain novel constructions, combinations and arrangements of parts as will be subsequently specified and claimed.

For a full and more complete understanding of the invention, reference may be had to the following description and accompanying drawings, in which—

Figure 2 is an elevation of a showing from the end of the construction shown in Figure 2, while

Figure 5 is an end view of the construction shown in Figure 4, while

Figure 1:
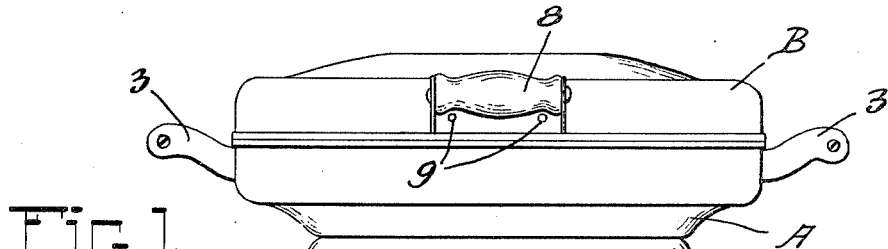
Figure 1 is a view in side elevation of an embodiment of my invention which is designed primarily for home use.

While a preferred specific embodiment of the invention is here shown, it is to be understood that I am not to be limited to the exact constructions and illustrations because various modifications of these details may be provided in putting the invention into practice within the purview of the appended claims.

Throughout the following description and various figures of the drawings, like reference characters denote corresponding parts.

Figure 2:
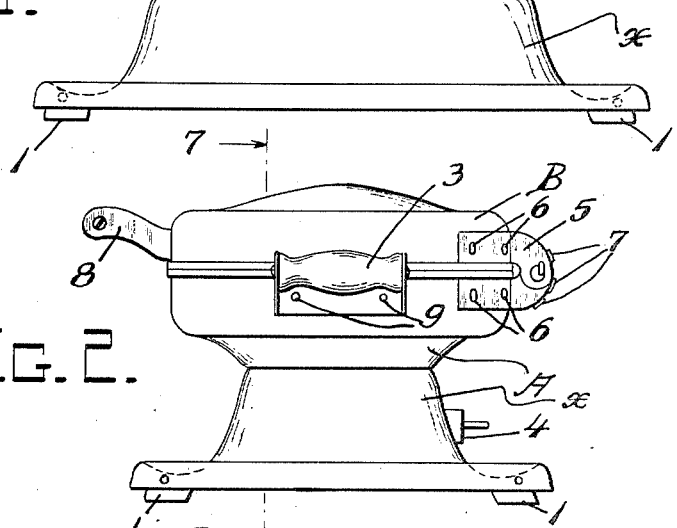
Figure 3:
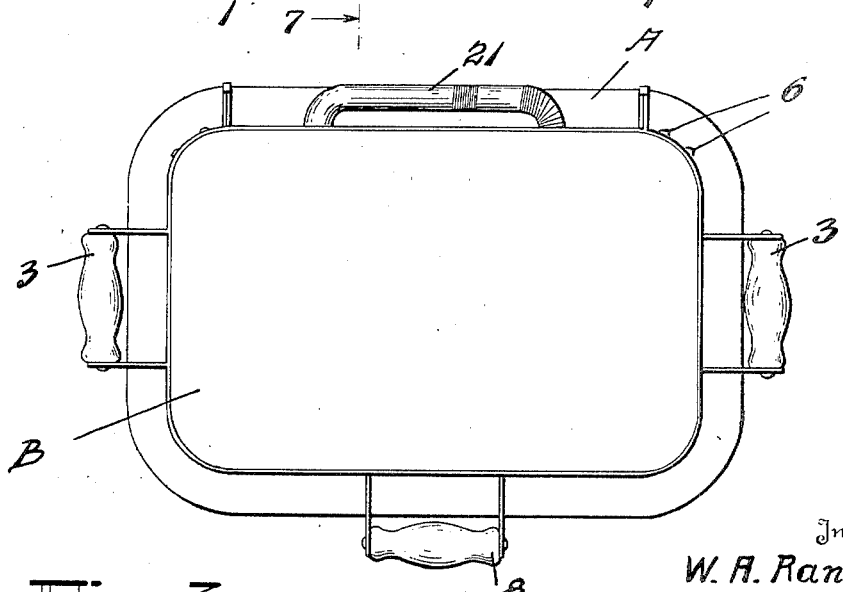
Figure 3 is a plan view of the same construction.
Figure 4:
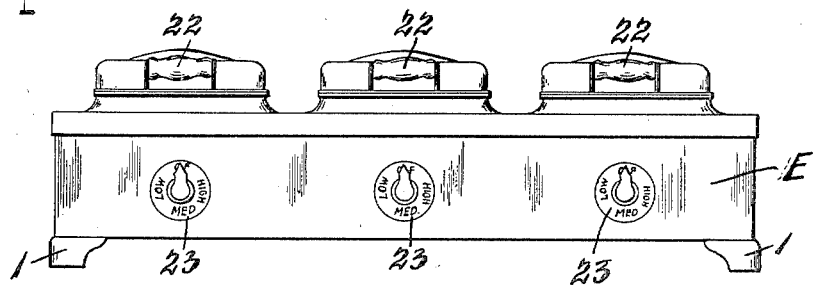
Figure 4 is a front view in elevation of a commercial embodiment of the invention.
Figure 5:
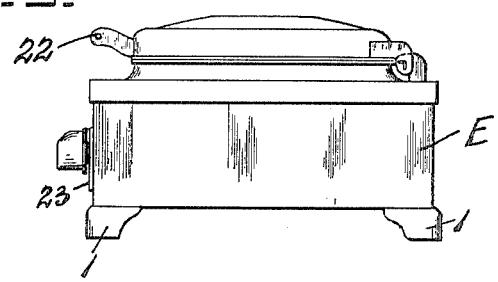

First referring to Figures 1, 2 and 3 which illustrate the type of iron designed for home use, it is noted that the iron comprises the mold portion consisting of the members A and B and the pedestal or stand portion X. The stand X may include foot members 1 which maintain the same upraised from the surface on which the iron is set. For carrying the entire waffle iron from place to place, the lower mold member A is provided with the handles 3 so that the iron may be lifted in its entirety and carried from place to place.

In the present embodiment heating means for heating the molds are provided in the form of electric heat resisting elements. For connecting these heating elements with a current supply line a suitable connection is shown at 4. Of course any suitable heating means may be employed with the molds as circumstances dictate. They may be heated by coal, gas, oil, etc.

The mold members A and B are hinged together by the hinge members 5 secured to the mold members by the screws 6 and which are provided with lugs 7 which function both as guides and as stops for limiting the swinging movement of the top mold member. The top mold member B is provided with a handle 8 properly positioned to facilitate the opening swinging movement of this member.

Figure 7:
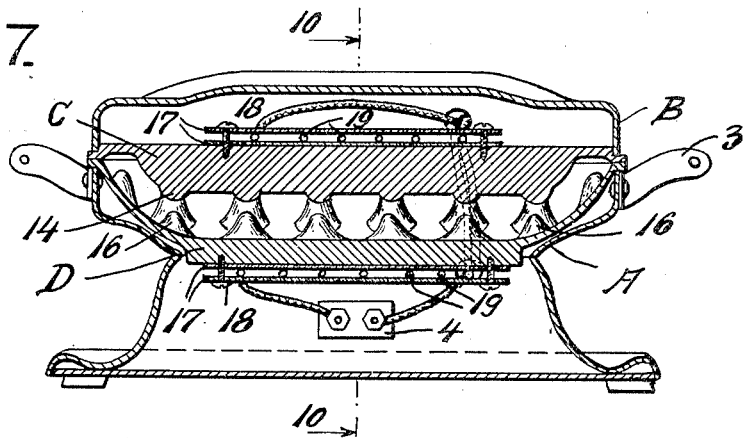
Figure 7 is a vertical section taken about on the line 7—7 of Figure 2.
Figure 8:
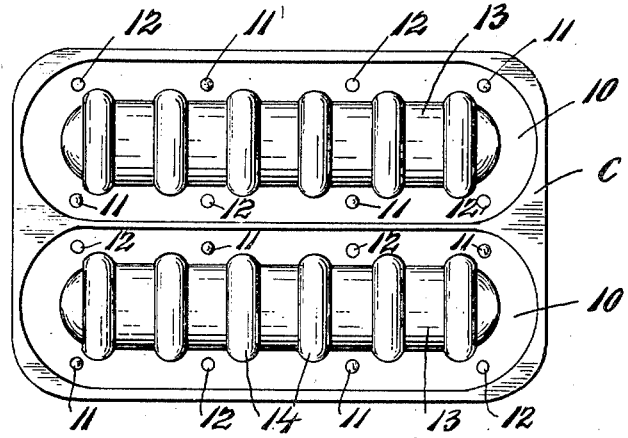
Figure 8 is a plan view of the bottom of the top mold member.
Figure 9:
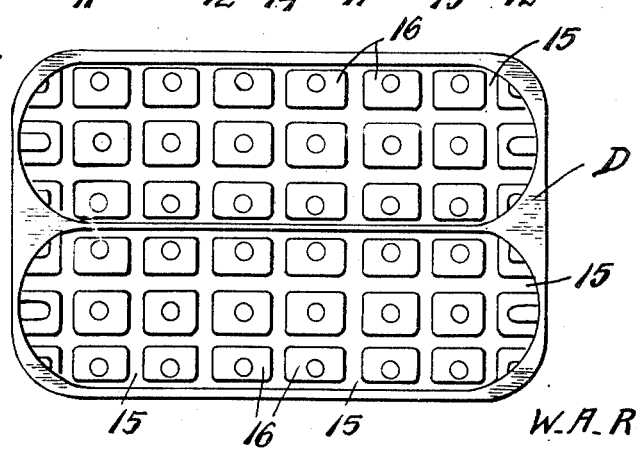
Figure 9 is a plan view of the mold.
Figure 10:
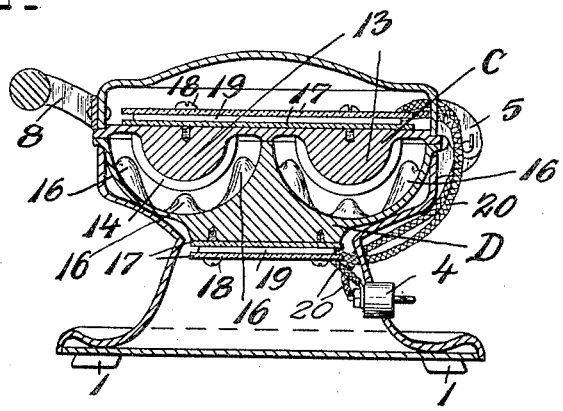
Figure 10 is a vertical section taken about on the line 10—10 of Figure 7.
Figure 11:
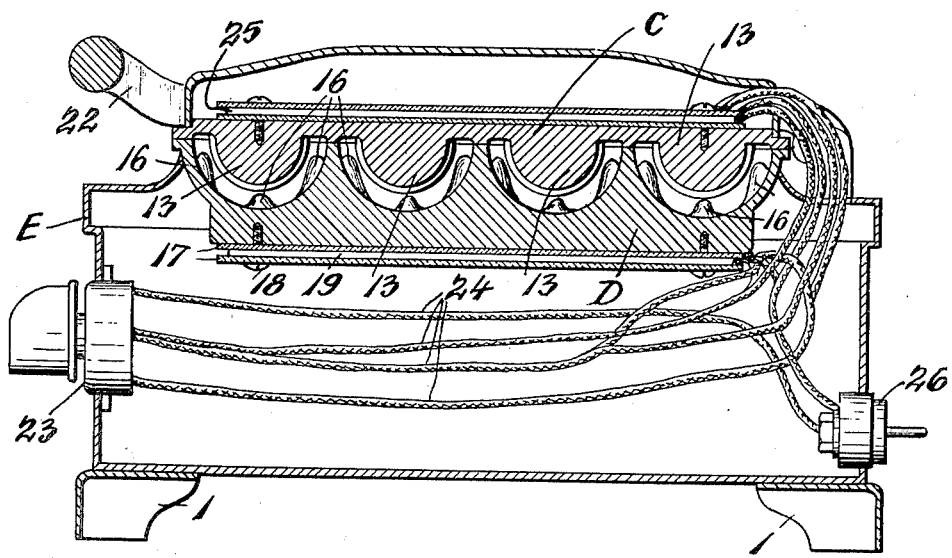
Figure 11 is a view in section taken about on the line 11—11 of Figure 6.

For a detailed understanding of the interior construction of the waffle iron, reference may be had to Figures 7, 8 and 9. The lower and upper mold members A and B include the cooking metal members C and D which are secured thereto in any preferred manner. The members C and D are designed for cooperation so that they will provide a pair of waffles. The member C is formed with flat surfaces 10 which are arranged so that they extend around the periphery of each waffle which is cooked by the iron. These surfaces are provided with the lugs 11 and recesses 12 which form complemental recesses and lugs in the waffles formed by the molds. The member C also has the projections 13 provided with ribs 14 which function to shape the cavity in the waffle cooked by the iron.

Figure 6:
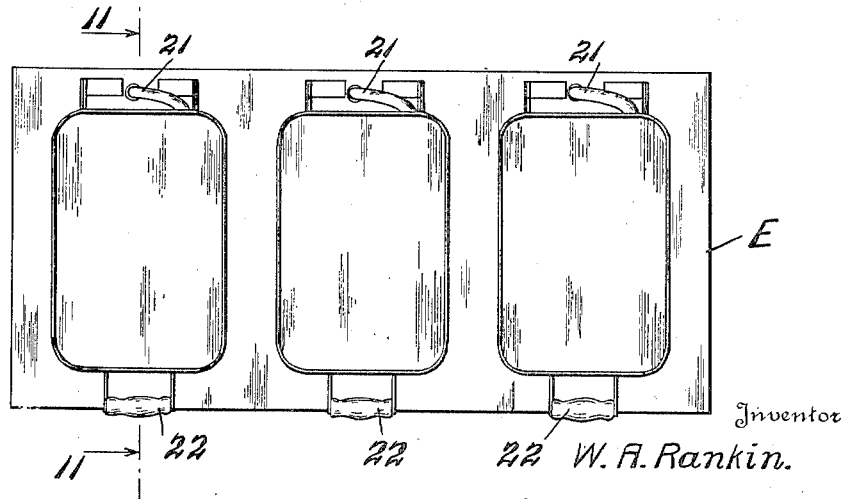
Figure 6 is a plan view of the same construction.

The lower cooking member D is of course formed with the two main recesses shown at 15 which are adapted to receive the parts 13 carried by the member C but which parts will be spaced from the member D when the iron is in cooking position. Extending into the cavity in the member D are projections 16, the particular arrangement of which is clearly shown in Figure 7. These projections are all vertically disposed so that they will not interfere with the removal of a cooked waffle from the mold. In further pursuance of obtaining an easy removal of a waffle from the mold the projections 16 are formed in a certain shape which readily lends itself to the achievement of the desired end. The end of each of the projections is of an arcuate shape, the curve of which is substantially the same as the curve of the upper face of the mold. When one half of the mold is lifted no binding action occurs which normally would be the case were not the projections shaped as above noted and vertically disposed. This arrangement insures the condition of having all of the batter in close proximity to some heating metal whereby the same is properly cooked. The heating instrumentalities employed may be briefly described as follows:—Spaced plates 17 are fastened to the molds C and D by means of screws as shown at 18. Interposed between the spaced plates 17 are heating elements 19 which are connected together by wires 20. The wires 20 are then brought to the plug 4 thereby providing a means for heating the molds C and D. A flexible tube 21 covers the wires 20 between the parts A and B as shown in Figures 3 and 6.

The commercial embodiment of the invention is developed in Figures 4, 5, 6 and 11. The only real distinction between this form and the others is that it is designed to cook more waffles in groups, each group being provided with independent heat controls. In the form shown, four waffles may be cooked by any one unit, there being three units provided in one cooker which is referred to generally by the reference character E. The handle 22 is provided for the upper member B of each unit, which is also provided with a heat controlling switch shown at 23. Wires 24 set up the connection between the heating elements and the switch to provide the variable heat essential to the proper operation of the iron. The plug 26 provides a means for connecting the cooking members with the main current supply line.

Having thus described my invention, what I claim as new and desire to secure by Letters Patent of the United States, is:—

1. In a cooking construction of the class described, the combination, with mold members adapted to cook a pair of unconnected batter products, of instrumentalities carried by the mold members for forming means on the products for interlocking said products together.

2. A waffle iron of the class described, comprising, in combination, a mold member formed with cavities therein, a second mold member adapted to cooperate with the first mold member in forming and cooking waffles, means for heating the mold members, means on the second mentioned mold member for forming cavities in the waffles, and ribs carried by said cavity forming means.

3. A waffle iron of the class described, comprising, in combination, a mold member formed with cavities therein, a second mold member adapted to cooperate with the first mold member in forming and cooking waffles, means for heating the mold members, means on the second mentioned mold member for forming cavities in the waffles, ribs carried by said cavity forming means, and projections on the first mold member located in said cavity and arranged so as not to interfere with the removal of waffles from the mold.

4. A waffle iron of the class described, comprising, in combination, a mold member formed with a pair of cavities therein, a second mold member hinged to the first one and having projecting portions similar in conformation to the cavities means for heating the mold members, and means carried by said mold members for forming lugs and recesses on waffles cooked thereby, said means being arranged so that the lugs and recesses on each waffle are complemental to the recesses and lugs, respectively, of the other, whereby said waffles may be interlocked.

5. In a waffle iron construction of the class described, a mold member having a curved concave surface provided with upstanding substantially pyramidal projections adapted to form depressions in a waffle cooked by said member, the apexes of said projections defining an arc substantially parallel to said surface, whereby to thoroughly cook all parts of the waffle product and facilitate removal of the cooked waffle.

In testimony whereof I affix my signature.

WILLIAM A. RANKIN.